(12) United States Patent
Classen et al.

(10) Patent No.: US 10,914,937 B2
(45) Date of Patent: Feb. 9, 2021

(54) PIVOT APPARATUS FOR A MICROMIRROR, AND ILLUMINATION APPARATUS HAVING A PIVOT APPARATUS FOR A MICROMIRROR

(71) Applicant: Robert Bosch GmbH, Stuttgart (DE)

(72) Inventors: Johannes Classen, Reutlingen (DE); Ralf Noltemeyer, Herrenberg (DE); Arnd Kaelberer, Schlierbach (DE); Peter Sudy, Budapest (HU); Hans Artmann, Boeblingen-Dagersheim (DE)

(73) Assignee: Robert Bosch GmbH, Stuttgart (DE)

( * ) Notice: Subject to any disclaimer, the term of this patent is extended or adjusted under 35 U.S.C. 154(b) by 786 days.

(21) Appl. No.: 15/241,490

(22) Filed: Aug. 19, 2016

(65) Prior Publication Data
US 2017/0059852 A1    Mar. 2, 2017

(30) Foreign Application Priority Data

Sep. 2, 2015 (DE) .......................... 10 2015 216 811

(51) Int. Cl.
*G02B 26/08* (2006.01)
*G02B 26/10* (2006.01)

(52) U.S. Cl.
CPC ....... *G02B 26/0833* (2013.01); *G02B 26/101* (2013.01)

(58) Field of Classification Search
CPC ............ G02B 26/0833; G02B 26/0841; G02B 26/101; G02B 5/08; G02B 7/182; G02B 27/01; G02B 27/18; G02B 7/1821; G02B 26/085; G02B 26/0825; G02B 26/0858; B81B 3/00; B81B 7/02; G01B 11/25; G03F 7/20; G01S 7/481
USPC ........................................ 359/224.1
See application file for complete search history.

(56) References Cited

U.S. PATENT DOCUMENTS

| | | | | |
|---|---|---|---|---|
| 6,108,118 A | * | 8/2000 | Minamoto | G02B 26/105 359/224.1 |
| 6,512,625 B2 | * | 1/2003 | Mei | G02B 26/0841 359/290 |
| 7,271,943 B2 | * | 9/2007 | Yasuda | G02B 26/085 359/224.1 |
| 7,405,854 B2 | * | 7/2008 | Desai | B81B 3/0035 359/198.1 |
| 7,775,433 B2 | * | 8/2010 | Ando | G02B 7/1821 235/454 |

(Continued)

FOREIGN PATENT DOCUMENTS

| | | |
|---|---|---|
| EP | 1247131 | 10/2002 |
| WO | 0148527 | 7/2001 |

*Primary Examiner* — Euncha P Cherry
(74) *Attorney, Agent, or Firm* — Norton Rose Fulbright US LLP; Gerard Messina

(57) ABSTRACT

A pivot apparatus, in particular a pivot apparatus for a micromirror, a fixed base frame being connected, directly or indirectly via an intermediate frame, to a pivotable carrier element. Spring elements having flexural springs are respectively disposed between the base frame and carrier element, base frame and intermediate frame, and intermediate frame and carrier element. The use of flexural springs enables good thermal coupling between the individual components, and an increase in robustness. The pivot apparatus can be embodied in particular as a microelectromechanical system.

13 Claims, 3 Drawing Sheets

(56) References Cited

U.S. PATENT DOCUMENTS

| | | | | |
|---|---|---|---|---|
| 8,348,436 B2* | 1/2013 | Ikegami | ............... | G09G 3/02 |
| | | | | 313/307 |
| 2012/0162739 A1* | 6/2012 | Yamada | ............ | G02B 26/101 |
| | | | | 359/212.1 |
| 2014/0192397 A1* | 7/2014 | Atnip | ............ | B81C 1/00642 |
| | | | | 359/291 |

* cited by examiner

PIVOT APPARATUS FOR A MICROMIRROR, AND ILLUMINATION APPARATUS HAVING A PIVOT APPARATUS FOR A MICROMIRROR

CROSS REFERENCE

The present application claims the benefit under 35 U.S.C. § 119 of German Patent Application No. DE 102015216811.5 filed on Sep. 9, 2015, which is expressly incorporated herein by reference in its entirety.

FIELD

The present invention relates to a pivot apparatus for a micromirror and to an illumination apparatus having such a pivot apparatus.

BACKGROUND INFORMATION

European Patent Application EP 1 247 131 A2 describes a micromirror having a cantilevered mirror surface that is deflectable out of an idle position around at least one torsion axis. The mirror surface is connected to a support body via at least two torsion beams guided in parallel fashion next to one another.

Such micromirror assemblages generally encompass torsion springs for returning a deflected micromirror back into the idle position. Thermal coupling for heat dissipation from the mirror element is also accomplished by way of these torsion springs.

Micromirror assemblages of this kind are used at present in an increasing number of application sectors. Micromirror assemblages are found, for example, in projectors or head-up displays, in barcode reading devices, in apparatuses for light detection or for scanning, for example in so-called LIDAR systems. A further application sector for micromirrors is lithography using so-called extreme ultraviolet radiation (EUV). This EUV lithography is utilized, for example, in the semiconductor industry.

As the intensity of the light reflected from such a micromirror increases, the thermal load on the micromirror also increases. Sufficient heat dissipation from, or cooling of, the micromirror must therefore also be ensured.

A need therefore exists for a pivot apparatus for a micromirror which enables reliable heat dissipation from a micromirror. A need also exists for a pivot apparatus for a micromirror which enables a maximally robust construction.

SUMMARY

According to one aspect, the present invention provides a pivot apparatus for a micromirror.

In accordance with the present invention, a pivot apparatus for a micromirror is provided having a base frame, a carrier element, and a first spring element. The carrier element of the pivot apparatus is couplable to a micromirror. The first spring element of the pivot apparatus encompasses at least one flexural spring. The spring element is coupled to the carrier element of the pivot apparatus. The base frame is furthermore coupled to the first spring element of the pivot apparatus.

The base frame can be connected to the carrier element, for example, by way of the first spring element. It is moreover also possible, however, for further components besides the first spring element also to be present between the base frame and the carrier element.

According to the present invention, the spring elements of a pivot apparatus for a micromirror may be embodied as flexural springs. A "flexural spring" is to be understood in this connection as a spring that has a relatively small thickness in proportion to its width. A width of a flexural spring can be, for example, at least three times, five times, or where applicable more than ten times the thickness. Such a configuration of the spring elements in a micromirror, as flexural springs, allows a particularly robust construction to be achieved. In particular, great robustness can be attained in the spatial directions perpendicular to the possible deflection of the flexural springs.

Because of the relatively large width of the flexural springs, such flexural springs can also have a comparatively large cross section. Good thermal coupling between the two ends of the flexural springs can thus also be achieved by way of such flexural springs. This enables good heat discharge from a component, for example a micromirror, coupled to the flexural spring.

The use of flexural springs in a pivot apparatus having a micromirror also allows the implementation of novel and particularly advantageous structures which, depending on the application, enable a particularly advantageous configuration of the pivot apparatus.

According to an embodiment the pivot apparatus further encompasses an intermediate frame and a second spring element, the second spring element encompassing a further flexural spring. The intermediate frame is coupled to the carrier element by way of the first spring element. The base frame is coupled to the intermediate frame by way of the second spring element. In particular, the flexural springs of the first spring element can have an orientation that is directed perpendicularly to the orientation of the further flexural springs of the second spring element. It is thus possible to implement a pivot apparatus that enables a deflection of a micromirror around two spatial axes.

According to a further embodiment the first spring element encompasses a flexural spring made of monocrystalline silicon, and/or the second spring element encompasses a further flexural spring made of monocrystalline silicon. Flexural springs made of monocrystalline silicon on the one hand allow the desired spring properties of the flexural springs to be implemented, while good thermal coupling for heat dissipation from the micromirror can furthermore also be implemented.

According to a further embodiment the carrier element encompasses a plurality of tilt elements. Each tilt element can be connected to at least one flexural spring of the first spring element. Thanks to the division of the carrier element into multiple tilt elements that are each coupled by way of separate flexural springs to the further components of the pivot apparatus, pivot apparatuses for a micromirror which are particularly suitable depending on the application instance can be implemented.

According to a further embodiment the intermediate frame of the pivot apparatus encompasses a plurality of intermediate elements. Each intermediate element of the intermediate frame can be connected to at least one further flexural spring of the second spring element. This also makes possible a division of the intermediate frame into multiple sub-regions, each part of the intermediate frame being capable of being coupled to the base frame via at least one separate flexural spring.

According to a further embodiment each intermediate element of the intermediate frame is connected to at least one flexural spring of the first spring element.

According to a further embodiment the pivot apparatus further encompasses a deflection apparatus. The deflection apparatus is designed to deflect the carrier element with respect to the base frame. In particular, each connection between the base frame and carrier element, and between the base frame and intermediate frame and the intermediate frame and carrier element, can be respectively equipped with a deflection apparatus. The deflection apparatus enables an active deflection of the micromirror out of the idle position, while the first spring element and the second spring element are respectively designed to pull the carrier element, and thus the micromirror, back into the idle position.

According to a further embodiment the pivot apparatus encompasses a reflection element. This reflection element is mechanically coupled to the carrier element of the pivot apparatus. In particular, the reflection element can be connected to the carrier element by way of a suitable holding element. The reflection element can be, for example, a micromirror or the like.

According to a further embodiment the reflection element encompasses a molybdenum-silicon (MoSi) coating. Such MoSi coatings are particularly suitable especially for EUV lithography.

According to a further aspect the present invention creates an illumination apparatus having a light source and a pivot apparatus according to the present invention. The light source can be designed to emit light or short-wave electromagnetic radiation. In particular, the reflection element disposed in the pivot apparatus according to the present invention is designed in this context to reflect the radiation emitted from the light source.

Further embodiments and advantages of the present invention are evident from the description below with reference to the figures.

DETAILED DESCRIPTION OF EXAMPLE EMBODIMENTS

Figure 1:
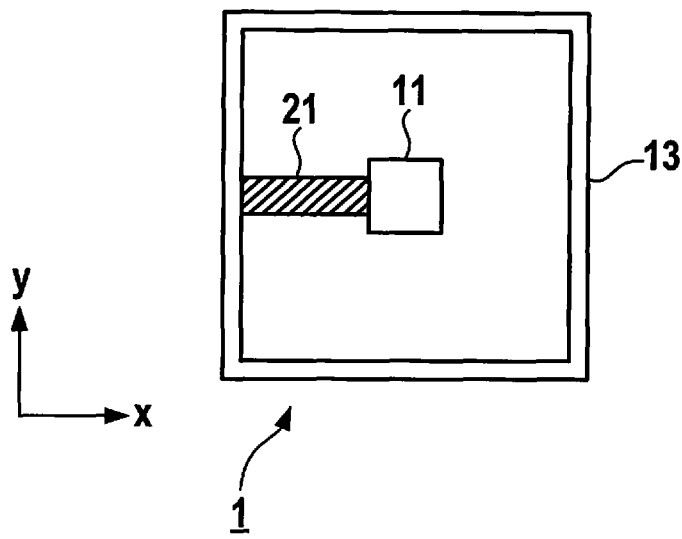
FIG. 1 schematically depicts a pivot apparatus for a micromirror, according to an embodiment.

Even though the pivot apparatus of the present invention is described herein in conjunction with the deflection of a micromirror, the pivot apparatus according to the present invention is not limited to such applications. The pivot apparatus can instead, as will be explained below in detail, also be used for any further applications. The embodiments described below represent, merely by way of example, some possibilities for implementing pivot apparatuses according to the present invention. To the extent appropriate, the embodiments that are described can be arbitrarily combined with, or can supplement or modify, one another. In the embodiments hereinafter, identical reference characters refer to identical or similar components or subassemblies.

FIG. 1 schematically depicts a pivot apparatus 1 according to an embodiment. This pivot apparatus 1, like all further embodiments of pivot apparatuses which are described, can be implemented on the basis of microelectromechanical (MEM) components. Pivot apparatuses having very small dimensions can, in particular, be implemented in this manner. Pivot apparatus 1 according to the embodiment in FIG. 1 encompasses a base frame 13 and a carrier element 11, base frame 13 and carrier element 11 being connected to one another by way of a first spring element 21. Base frame 13 can be fixedly connected to further components. For example, base frame 13 can be mounted on a suitable substrate (not depicted here). This substrate can be, for example, a circuit board. This circuit board can, for example, encompass conductor paths or printed circuits by way of which control can be applied to a deflection apparatus (not depicted in this exemplifying embodiment) in order to deflect carrier element 11 with respect to base frame 13. Because of the flexible coupling of carrier element 11 to base frame 13, carrier element 11 executes a tilting motion out of the X-Y plane.

The deflection apparatus for tilting carrier element 11 can be, for example, a microelectromechanical structure (MEMS). Upon application of a voltage to the deflection apparatus, carrier element 11 can be tilted out of the X-Y plane. In addition, upon deflection of carrier element 11 a force is exerted by way of first spring element 21 on carrier element 11, which force acts against the deflection of carrier element 11 out of the X-Y plane.

Figure 2:
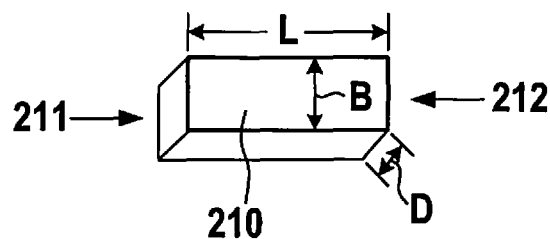
FIG. 2 schematically depicts a flexural spring for a pivot apparatus, according to an embodiment.

First spring element 21 can encompass in particular a so-called flexural spring. FIG. 2 schematically depicts a first spring element 21 having a flexural spring for a pivot apparatus 1, according to an embodiment. First spring element 21 can have, for example, a flexural spring 210. This flexural spring can be connected, for example, at a first end 211 to base frame 13. The opposite end 212 can furthermore be connected to carrier element 11. Alternatively, however, it is also possible for flexural spring 210 to be connected at first end 211 and/or at second end 212 to a holding apparatus (not depicted here). In this case flexural spring 210 can be connected by way of this holding apparatus to a further component, for example to carrier element 11 or to base frame 13. It is moreover also possible for further intermediate elements also to be disposed between first spring element 21 and base frame 13 or carrier element 11. Flexural spring 210 of first spring element 21 has a length L between first end 210 and second end 212. Flexural spring 210 furthermore has a thickness D and a width B. Thickness D preferably extends in the spatial direction in which a deflection of flexural spring 210 is possible. Width B is furthermore that dimension of flexural spring 210 which proceeds perpendicularly to thickness D and to length L. Flexural springs are notable in particular for the fact that their thickness D is substantially less than their width B. For example, the width B of flexural spring 210 can be three times, five times, or ten or more times greater than thickness D. Flexural springs 210 of a pivot apparatus according to the present invention can have, in particular, a thickness D of between 0.5 and 5 micrometers. The thickness D of a flexural spring can preferably be between 1 and 3 micrometers. Flexural springs having dimensions deviating therefrom are, however, also possible.

Figure 3:
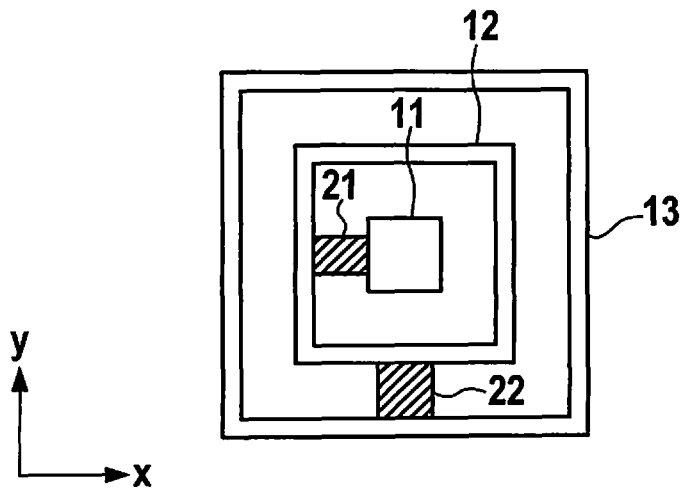
FIGS. 3 to 6 are schematic depictions of pivot apparatuses for a micromirror, according to further embodiments.

FIG. 3 schematically depicts a pivot apparatus 1 according to a further embodiment. In this embodiment carrier element 11 is not connected directly via first spring element 21 to base frame 13. In this embodiment pivot apparatus 1 instead furthermore encompasses an intermediate frame 12. Carrier element 11 is connected via first spring element 21 to intermediate frame 12. Intermediate frame 12 is furthermore connected via a second spring element 22 to base frame 13. With this pivot apparatus 1 in the idle position, base frame 13, intermediate frame 12, and carrier element preferably lie in one common plane (X-Y plane). Second spring element 22, analogously to first spring element 21, likewise encompasses at least one flexural spring. The flexural spring of first spring element 21 is preferably oriented perpendicularly to the flexural spring of second spring element 22. For deflection of carrier element 11 out of the X-Y plane, a respective deflection apparatus (not depicted) can be disposed both on first spring element 21 and on second spring element 22. A deflection of carrier element 11 along first spring element 21 causes a deflection of carrier element 11 out of the X-Y axis by way of a tilting motion, the tilting motion being executed along an axis that proceeds parallel to the Y axis of the coordinate system depicted in FIG. 3. A deflection at second spring element 22 thereby executes a tilting motion of carrier element 11 (together with intermediate frame 12), in which motion carrier element 11 executes a tilting motion out of the X-Y axis, this tilting motion proceeding around an axis parallel to the X axis.

Figure 4:
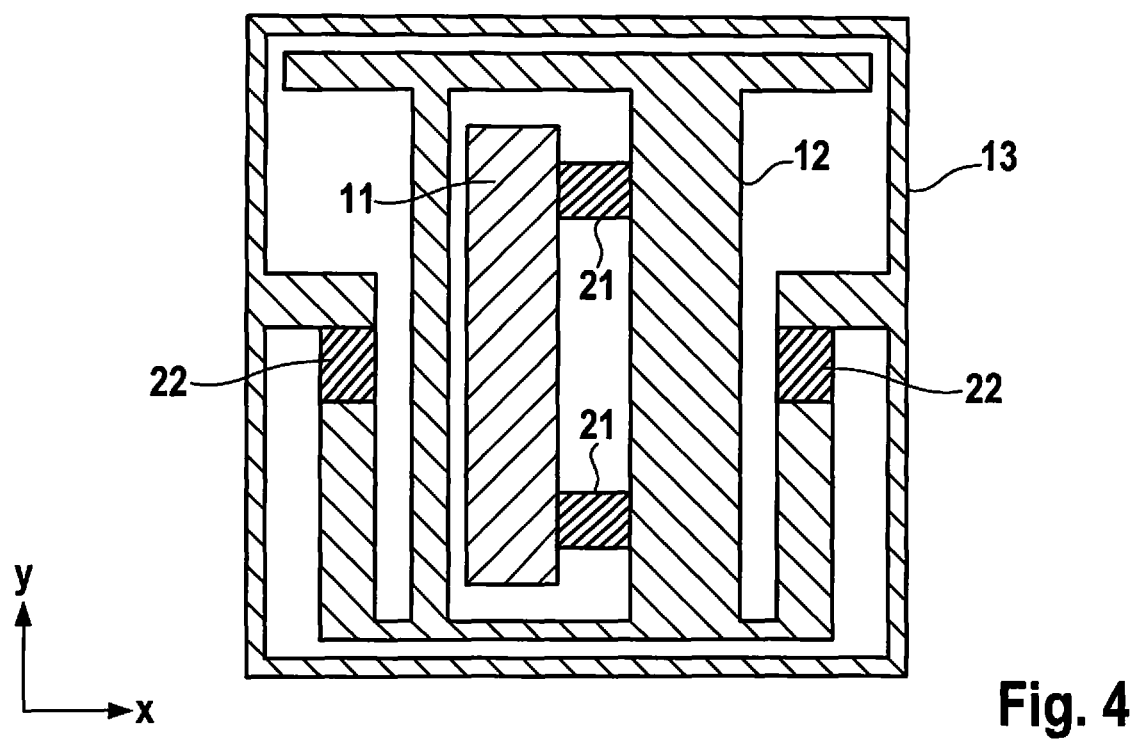

FIG. 4 schematically depicts a pivot apparatus 1 according to yet another embodiment. As is evident from this example, both the coupling between base frame 13 and intermediate frame 12, and the coupling between intermediate frame 12 and carrier element 11, can also respectively be implemented by way of multiple first and second spring elements 21, 22. Preferably first spring elements 21 and second spring elements 22 can be disposed along axes of symmetry of base frame 13.

Figure 5:
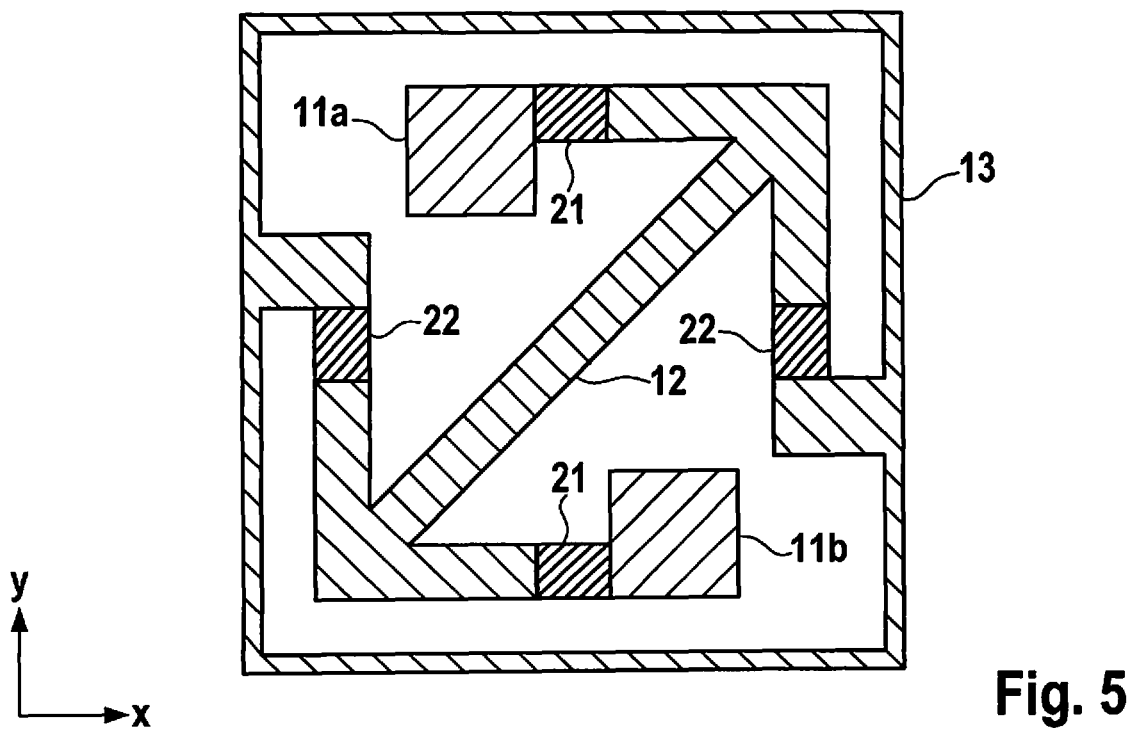

FIG. 5 schematically depicts a pivot apparatus 1 according to yet another embodiment. The configuration made up of base frame 13, intermediate frame 12, and carrier element 11, and of first spring elements 21 and second spring elements 22, has a centrically symmetrical conformation. As is evident from this Figure, carrier element 11 can also have multiple separate tilt elements 11a and 11b. Each of these tilt elements 11a and 11b can be connected to intermediate frame 12 via a separate first spring element 21.

It is moreover also possible for intermediate frame 12 to encompass a plurality of separate intermediate elements. Each of these intermediate elements can also be connected to base frame 13 by way of a separate second spring element 22. Each of the intermediate elements of intermediate frame 12 can furthermore be connected to carrier element 11 with a separate first spring element 21. In this case as well, carrier element 11 can encompass multiple tilt elements 11a and 11b. In this case each tilt element 11a and 11b of carrier element 11 can be connected to a corresponding intermediate element of intermediate frame 12.

Figure 6:
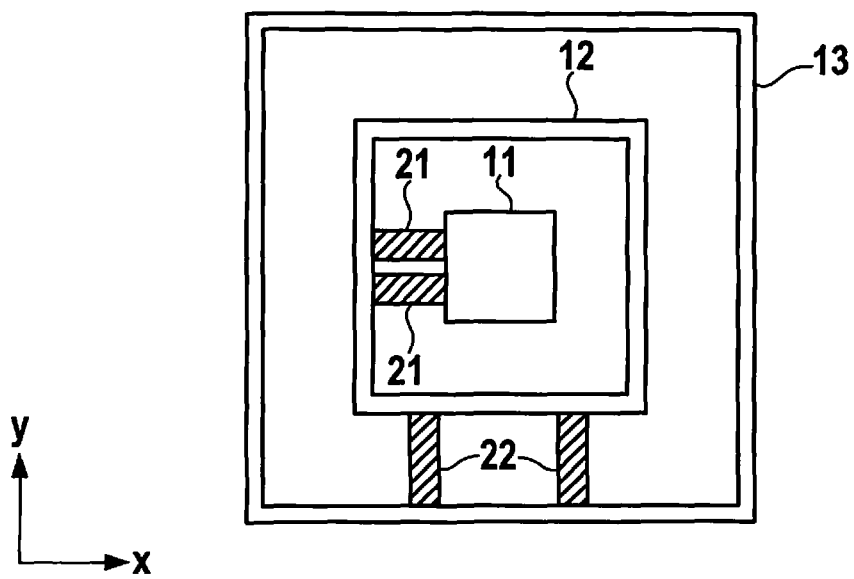

FIG. 6 shows a further pivot apparatus 1 according to an embodiment. As is evident from this depiction, first spring element 21 and/or second spring element 22 can also each encompass multiple flexural springs, preferably disposed in parallel fashion. For example, each spring element 21, 22 can encompass two, three, five, or more flexural springs. The stiffness of the springs can be reduced as a result of such a disposition of a spring element 21, 22 having multiple parallel flexural springs, while the robustness of the construction of pivot apparatus 1 can continue to be maintained.

Figure 7:
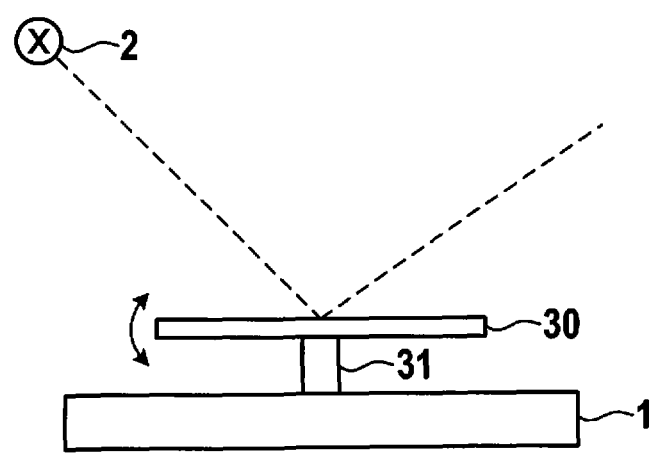
FIG. 7 schematically depicts an illumination apparatus having a pivot apparatus for a micromirror, according to an embodiment.

FIG. 7 schematically depicts a cross section through an illumination apparatus having a pivot apparatus 1 according to the present invention, in accordance with an embodiment. Here a reflection element 30 is connected to carrier element 11 of pivot apparatus 1. The coupling between reflection element 30 and carrier element 11 can be accomplished, for example, with a suitable holding element 31. It is thereby also possible to achieve sufficient spacing between pivot apparatus 1, in particular base frame 13, on the one hand, and reflection element 30 on the other hand, to enable a deflection of reflection element 30 out of its idle position. A deflection of carrier element 11 in pivot apparatus 1 also results in the occurrence of a tilt of reflection element 30 out of its idle position. The tilting motion of reflection element 30 can be equivalent, for example, to 5°, 10°, 20°, or where applicable even more.

Reflection element 30 is impinged upon by a light source 2 with a light beam. The light beam is reflected at reflection element 30. The deflection of the light beam from light source 2 varies in accordance with the deflection of reflection element 30. Light source 3 can be any light source that emits a directed light beam. The light is not limited here to visible light. It is instead also possible for light source 2 to emit infrared or ultraviolet light. Applications for EUV lithography are moreover also possible. For EUV lithography in particular, reflection element 30 can encompass a coating with molybdenum-silicon. The coating with molybdenum-silicon (Mo—Si) can preferably have several layers.

The pivot apparatus according to the present invention is suitable for any applications of microelectromechanical systems which require a deflection in one or more spatial directions. Thanks to the use of flexural springs in spring elements 21 and 22, on the one hand elevated robustness can be achieved. Stability in terms of shocks and parasitic vibrations can thereby also, in particular, be increased. The flexural springs in first spring element 21 and second spring element 22 furthermore, because of their large cross section, also make possible very good thermal conduction. A thermal power dissipation that may occur between carrier element 11 and base frame 13 can thus be discharged very effectively.

Flexural springs made of monocrystalline silicon are particularly suitable as flexural springs for microelectromechanical systems having a pivot apparatus 1 according to the present invention. As already discussed previously, the flexural springs have in this context a thickness that is substantially less than the width and also the length of the flexural springs.

Although in the preceding exemplifying embodiments carrier element 11 and, where applicable, also intermediate frame 12 are respectively disposed in an inner region of base frame 13, the present invention is also not restricted to those embodiments. Instead, embodiments are moreover also possible in which carrier element 11, and where applicable also multiple tilt elements 11a and 11b, are disposed in a region disposed around a base frame 13. Base frame 13 furthermore also does not need to be embodied in one piece. It is instead also possible for base frame 13 to be divided into multiple sub-elements on each of which a second spring element 22 is coupled respectively to an intermediate frame 12 or multiple intermediate elements.

In summary, the present invention relates to a pivot apparatus, in particular to a pivot apparatus for a micromirror, a fixed base frame being connected, directly or indirectly via an intermediate frame, to a pivotable carrier element. Spring elements having flexural springs are respectively disposed between the base frame and carrier element, base frame and intermediate frame, and intermediate frame and carrier element. The use of flexural springs enables good thermal coupling between the individual components, and an increase in robustness. The pivot apparatus can be embodied in particular as a microelectromechanical system.

What is claimed is:

1. A pivot apparatus for a micromirror, comprising:
   a carrier element that is couplable to the micromirror; and
   a first spring element that includes a flexural spring and that is coupled to the carrier element; and a base frame that is coupled to the first spring element, wherein a width of the first spring element is at least three times a thickness of the first spring element, wherein only the first spring element couples the carrier element to the base frame, wherein the first spring element is directly coupled to the carrier element and to the base frame.

2. The pivot apparatus as recited in claim 1, further comprising:
an intermediate frame;
a second spring element that includes a further flexural spring, wherein the intermediate frame is coupled to the carrier element by way of the first spring element, and the base frame is coupled to the intermediate frame by way of the second spring element.

3. The pivot apparatus as recited in claim 2, wherein at least one of the first spring element and the second spring element includes a flexural spring made of monocrystalline silicon.

4. The pivot apparatus as recited in claim 1, wherein the carrier element includes a plurality of tilt elements, and each tilt element is connected to at least one flexural spring of the first spring element.

5. The pivot apparatus as recited in claim 2, wherein the intermediate frame includes a plurality of intermediate elements, and each intermediate element of the intermediate frame is connected to at least one further flexural spring of the second spring element.

6. The pivot apparatus as recited in claim 5, wherein each intermediate element of the intermediate frame is connected to at least one flexural spring of the first spring element.

7. The pivot apparatus as recited in claim 1, further comprising:
a deflection apparatus that is designed to deflect the carrier element with respect to the base frame.

8. The pivot apparatus as recited in claim 1, further comprising:
a reflection element that is connected to the carrier element.

9. The pivot apparatus as recited in claim 8, wherein the reflection element includes a molybdenum-silicon coating.

10. An illumination apparatus, comprising:
a light source; and
a pivot apparatus including a carrier element that is couplable to a micromirror, a first spring element that includes a flexural spring and that is coupled to the carrier element, and a base frame that is coupled to the first spring element, and a reflection element that is connected to the carrier element, wherein a width of the first spring element is at least three times a thickness of the first spring element, wherein only the first spring element couples the carrier element to the base frame, and wherein the first spring element is directly coupled to the carrier element and to the base frame.

11. A pivot apparatus for a micromirror, comprising:
a carrier element that is couplable to the micromirror; and
a first spring element that includes a flexural spring and that is coupled to the carrier element;
a base frame that is coupled to the first spring element, wherein a width of the first spring element is at least three times a thickness of the first spring element, wherein only the first spring element couples the carrier element to the base frame;
an intermediate frame; and
a second spring element that includes a further flexural spring, wherein the intermediate frame is coupled to the carrier element by way of the first spring element, and the base frame is coupled to the intermediate frame by way of the second spring element, wherein the first spring element is directly coupled to the carrier element and to the base frame, and wherein the second spring element is directly coupled to the base frame and to the intermediate frame.

12. A pivot apparatus for a micromirror, comprising:
a carrier element that is couplable to the micromirror; and
a first spring element that includes a flexural spring and that is coupled to the carrier element;
a base frame that is coupled to the first spring element, wherein a width of the first spring element is at least three times a thickness of the first spring element, wherein only the first spring element couples the carrier element to the base frame;
an intermediate frame; and
a second spring element that includes a further flexural spring, wherein the intermediate frame is coupled to the carrier element by way of the first spring element, and the base frame is coupled to the intermediate frame by way of the second spring element, wherein a width of the second spring element is at least three times a thickness of the second spring element, and wherein only the second spring element couples the intermediate frame to the base frame.

13. The pivot apparatus as recited in claim 12, wherein the first spring element is oriented perpendicularly to the second spring element.

* * * * *